UNITED STATES PATENT OFFICE.

RENÉ BOHN, OF MANNHEIM, GERMANY, ASSIGNOR TO BADISCHE ANILIN & SODA FABRIK, OF LUDWIGSHAFEN-ON-THE-RHINE, GERMANY, A CORPORATION.

COMPOSITION OF MATTER SUITABLE FOR BUCKING.

1,095,793.  Specification of Letters Patent.  Patented May 5, 1914.

No Drawing.  Application filed January 27, 1909.  Serial No. 474,485.

*To all whom it may concern:*

Be it known that I, RENÉ BOHN, doctor of philosophy and chemist, citizen of the Swiss Republic, residing at Mannheim, Germany, have invented new and useful Improvements in Compositions of Matter Suitable for Bucking, of which the following is a specification.

Few, if any, coloring matters, when dyed or printed on vegetable fiber, are perfectly fast against bucking (that is, heating for a considerable time with dilute caustic alkali solution), particularly when the bucking is carried out under pressure. Attempts have been made to avoid this disadvantage of bucking by adding an inorganic oxidizing agent, such for instance as sodium bichromate and potassium permanganate, to the bath used. These, however, are not satisfactory because when bichromate is used, the chromium oxid which is formed colors the material yellow, and also when permanganate is used, the material is stained and the removal of such stains is a complicated process and tends to weaken the fiber.

I have discovered a new composition of matter which, when used in solution in water in a bucking bath, does not affect the coloring matters in the manner described, that is to say, the material dyed or printed with vat coloring matter can be successfully bucked without the color passing into the white or spreading beyond its proper limits.

My new composition of matter consists of a mixture of an alkali salt of nitrobenzene-monosulfonic acid and alkali. The alkali used may be caustic or carbonate or a salt possessing an alkaline reaction, like sodium phosphate or borax, or again mixtures of these alkalis can be used with or without water. Water would be added in cases where it is desired to have my new bucking mixture in solution so that it is immediately ready for use or merely requires further dilution with water in order to prepare the bucking bath, but as a rule in commerce for saving freight and the like the solid mixture will be preferred. I regard nitrobenzene sulfonic acid and nitro-toluene sulfonic acid as equivalent to one another.

My new composition may consist, for instance, of the following ingredients in approximately the proportion stated, namely, solid caustic soda thirteen parts, the sodium salt of nitrobenzene sulfonic acid eight parts. If desired, sufficient water may be added in each case to produce a paste or solution, and in order to use my new composition as a bucking vat, the materials mentioned in the foregoing example are simply dissolved in or mixed with four thousand parts of water. The material to be bucked is introduced into this bath and boiled for about two hours at a pressure of one atmosphere in excess of ordinary pressure.

In this application I do not claim the process of bucking with a mixture containing an alkali salt of nitrobenzene-monosulfonic acid and alkali, since this process is claimed in the divisional application Serial No. 799,484.

Now what I claim is:—

1. The hereinbefore described composition of matter comprising an alkali salt of nitrobenzene-monosulfonic acid and alkali.

2. The hereinbefore described composition of matter consisting of the sodium salt of nitrobenzene-monosulfonic acid, alkali and water.

3. The composition of matter comprising 13 parts of caustic soda and 8 parts of the sodium salt of nitrobenzene-monosulfonic acid.

4. The composition of matter consisting of 13 parts of caustic soda, 8 parts of the sodium salt of nitrobenzene-monosulfonic acid and water.

In testimony whereof I have hereunto set my hand in the presence of two subscribing witnesses.

RENÉ BOHN.

Witnesses:
    J. ALEC. LLOYD,
    SERESOR CATHERAM.